US009593950B2

(12) United States Patent
Davidsson et al.

(10) Patent No.: US 9,593,950 B2
(45) Date of Patent: Mar. 14, 2017

(54) METHOD AND SYSTEM FOR DETERMINING ON WHICH FLOOR OF A PARKING STRUCTURE AREA A VEHICLE IS POSITIONED

(71) Applicant: VOLVO CAR CORPORATION, Gothenburg (SE)

(72) Inventors: Staffan Davidsson, Vastra Frolunda (SE); Johan Maresch, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/705,427

(22) Filed: May 6, 2015

(65) Prior Publication Data

US 2015/0330788 A1    Nov. 19, 2015

(30) Foreign Application Priority Data

May 14, 2014   (EP) ..................................... 14168292

(51) Int. Cl.
G01C 21/00 (2006.01)
G01C 21/20 (2006.01)
(52) U.S. Cl.
CPC .......... *G01C 21/005* (2013.01); *G01C 21/206* (2013.01)
(58) Field of Classification Search
CPC ... G01C 21/00; G01C 21/005; G01C 21/2016
See application file for complete search history.

(56) References Cited

U.S. PATENT DOCUMENTS

| 4,279,563 A * | 7/1981 | Miller ................... B66B 11/006 |
| | | 191/2 |
| 5,925,087 A | 7/1999 | Ohnishi et al. |
| 2009/0312975 A1 | 12/2009 | Wyck Loomis |
| 2013/0297198 A1 | 11/2013 | Vande Velde et al. |

FOREIGN PATENT DOCUMENTS

DE    102011076245 A1    7/2012

OTHER PUBLICATIONS

Extended European Search Report Dated Oct. 30, 2014, Application No. 14168292.2-1557, Applicant Volvo Car Corporation, 9 Pages.

* cited by examiner

*Primary Examiner* — Nicholas Kiswanto
(74) *Attorney, Agent, or Firm* — Brooks Kushman P.C.

(57) ABSTRACT

A method performed by a floor determining device of a vehicle is provided for determining on which floor of a parking area the vehicle is positioned. The floor determining unit determines by means of a match determining unit that the vehicle at a current position has driven a travelled distance from a previous position of the vehicle, which horizontally coincides with the current position. The floor determining device determines by means of a floor change determining unit that the current position is situated on a higher floor above a previous floor of the previous position if the vehicle is determined to have driven the travelled distance more upwards than downwards from the previous position to the current position, and that the current position is situated on a lower floor beneath the previous floor if the vehicle is determined to have driven the travelled distance more downwards than upwards.

20 Claims, 3 Drawing Sheets

000000000# METHOD AND SYSTEM FOR DETERMINING ON WHICH FLOOR OF A PARKING STRUCTURE AREA A VEHICLE IS POSITIONED

CROSS-REFERENCE TO RELATED APPLICATIONS

This application claims foreign priority benefits under 35 U.S.C. §119(a)-(d) to European patent application number EP 14168292.2, filed May 14, 2014, which is incorporated by reference in its entirety.

TECHNICAL FIELD

The present disclosure relates to a floor determining device of a vehicle and a method performed therein for determining on which floor of a parking area, comprising at least two floors, the vehicle is positioned.

BACKGROUND

To efficiently utilize available space, parking areas commonly consist of a plurality of parking floors. Such e.g., multi-story car parks, which may comprise merely a few up to a large number of parking floors, enable many vehicles to be parked simultaneously. Along with the plurality of parking floors, however, arises the problem of keeping track of on which floor a vehicle is situated, e.g., has been parked. Although with positioning systems it is possible to keep track of the horizontal positioning of the vehicle, in e.g., a digital map, it is difficult to distinguish between the different floors. Furthermore, it is not unusual that a driver simply forgets on which parking floor he or she parked, or even forgets to check the same before leaving the vehicle and subsequently the multistory car park.

US 2013/0297198, for instance, addresses a need to generate accurate indoor mapping data of for instance a building, and relates to generating indoor map data from devices having GPS and non-GPS sensors.

Moreover, US 2009/0312975 relates to a forward-looking altitude detector, and discloses an altitude dead reckoning system using a speedometer and a forward-looking accelerometer for measuring changes in altitude.

DE 10 2011 076 245, for instance, relates to locating a motorcar in a multi-story car park. A motorcar-side communication unit emits a pressure value, a portable user device detects pressure around the portable user device, and an evaluating device compares the pressure values. As the portable user device approaches the parking floor of the vehicle, the difference between the pressure values decreases.

Although DE 10 2011 076 245 enables for a user carrying the portable user device to locate his or her vehicle, however, pressure sensors are a necessity. Furthermore, there is no suggestion regarding how to keep track on which floor the vehicle is positioned.

SUMMARY

It is therefore an object of embodiments herein to provide an improved approach of determining on which floor a vehicle is situated.

According to a first aspect of embodiments herein, the object is achieved by a method performed by a floor determining device of a vehicle for determining on which floor of a parking area comprising at least two floors, the vehicle is positioned. The floor determining unit determines, by means of a match determining unit comprised in the floor determining device, that the vehicle at a current position has driven a travelled distance from a previous position of the vehicle, which previous position is a position which horizontally coincides with the current position and/or which previous position is a position from which the vehicle has turned 360 degrees. The floor determining device determines, by means of a floor change determining unit comprised in the floor determining device, that the current position is situated on a higher floor above a previous floor of the previous position if the vehicle is determined to have driven the travelled distance more upwards than downwards from the previous position to the current position, and that the current position is situated on a lower floor beneath the previous floor if the vehicle is determined to have driven the travelled distance more downwards than upwards.

Thereby, difficulties related to distinguishing between different floors in e.g., a multi-story car park are alleviated. That is, determining that the vehicle at a current instant is situated at a position which horizontally, i.e., seen from above, corresponds to a position at which the vehicle previously was situated, is an indication of that the vehicle may have driven up or down at least one floor. Alternatively, determining that the vehicle has turned effectively 360 degrees in one turning direction is, in a similar manner, an indication of that the vehicle may have driven up or down at least one floor. Thus, by determining if a travelled distance from a previous position to a current position has been driven more upwards than downwards, or vice versa, by analyzing vehicle data associated with the vehicle during, and/or after, driving the travelled distance, it may be determined if the vehicle has moved to a higher floor, or a lower floor.

For that reason, an improved approach is provided for determining on which floor a vehicle is situated.

The technical features and corresponding advantages of the above mentioned method will be discussed in further detail in the following.

By introducing a method performed by a floor determining device of a vehicle for determining on which floor of a parking area comprising at least two floors, the vehicle is positioned, an approach is provided which enables for identifying where a vehicle is positioned not merely horizontally, but also vertically. The referred to "vehicle" may be represented by any arbitrary vehicle, for instance a car, truck, lorry, van, bus, motorcycle, etc. The referred to "parking area" comprising at least two floors may refer to e.g., a multi-story car park or parking garage comprising a plurality of floors intended for parking of vehicles. The floors may be arranged, e.g., aligned, on top of one another, e.g., in parallel with the ground. Alternatively and/or additionally, one or several of the floors may be arranged to have an inclination as compared to the ground. Furthermore, ramps on which the vehicle may travel to drive between different floors may be arbitrarily arranged. According to one example, a ramp may be arranged in a spiral manner, such that a vehicle, in order to go up or down one floor, may need to turn substantially 360 degrees, i.e., make a revolution.

Since the floor determining unit determines, by means of a match determining unit comprised in the floor determining device, that the vehicle at a current position has driven a travelled distance from a previous position of the vehicle, which previous position is a position which horizontally coincides with the current position, it is determined that the vehicle at a current instant passes/is situated at a position which horizontally, i.e., seen from above, corresponds to a position which the vehicle previously passed/was situated at. That is, comparing current horizontal positioning of the vehicle with previous horizontal positioning, i.e., comparing positioning as seen from above, e.g., retrieved from a digital map provided in the vehicle, enables for determining when there is a horizontal match of a current position with a previous position. Determining that there is a horizontal match may subsequently trigger determining the travelled distance of the vehicle from the previous position to the current position. The previous position as well as the current position may, for instance, be stored in a memory. Furthermore, determining the travelled distance from the previous position to the current position may be accomplished by computing the distance the vehicle has driven from the previous position to the current position.

"Horizontally coincides" is here intended to be interpreted in a broad manner, likewise including "substantially horizontally coincides". That is, the current position may slightly deviate horizontally from the previous position. Accordingly, the current position and the previous position need not necessarily be an exact horizontal match; rather, the current position may likewise be within a predetermined distance of the previous position, e.g., within a few meters. The referred to "match determining unit" may be any arbitrary unit which to some extent may be comprised in one or a combination of suitable electronic devices, such as e.g., one or several integrated arbitrary electronic control unit (ECU) nodes, adapted to receive input regarding the horizontal positioning of the vehicle, from e.g., a positioning system.

Alternatively and/or additionally, the previous position is a position from which the vehicle has turned 360 degrees. That is, it may be determined that the vehicle at a current instant, occurring at the current position, has turned effectively 360 degrees in one turning direction as compared to a previous vehicle direction, occurring at the previous position. By "effectively turned 360 degrees" is here intended that, rather than having to turn the 360 degrees continuously in a first turning direction, the vehicle may in fact have turned also in the opposite turning direction prior to finally reaching 360 degrees in the first turning direction. Keeping track of the direction of the vehicle, and e.g., store values thereof in a memory, enables for determining when the vehicle has turned 360 degrees, which may be referred to as a "match". The vehicle having turned 360 degrees may indicate that the vehicle has made a revolution, such as e.g., driven up/down a ramp to a higher/lower floor in a multi-story car park. In a similar manner, the vehicle having turned substantially 720 degrees may indicate that the vehicle has made two revolutions. Determining that the vehicle has turned 360 degrees may subsequently trigger determining the travelled distance of the vehicle from the previous position to the current position. "360 degrees" is here intended to be interpreted in a broad manner, likewise including "substantially 360 degrees". That is, the vehicle needs not necessarily have turned exactly 360 degrees; rather the vehicle may likewise have turned almost or close to 360 degrees, e.g., at least 350 degrees, or at least 340 degrees. Alternatively, "substantially 360" degrees may refer to a range, such as e.g., 330-390 degrees. The referred to "match determining unit" may further be adapted to receive input regarding turning of the vehicle from one or a plurality of vehicle sensors.

Since the floor determining device determines, by means of a floor change determining unit comprised in the floor determining device, that the current position is situated on a higher floor above a previous floor of the previous position if the vehicle is determined to have driven the travelled distance more upwards than downwards from the previous position to the current position, and that the current position is situated on a lower floor beneath the previous floor if the vehicle is determined to have driven the travelled distance more downwards than upwards, it is, in determining if the vehicle has driven the travelled distance more upwards than downwards, or vice versa, determined whether the current position and the previous position differ vertically, and subsequently determined whether the vehicle, at the current position, has moved up or down vertically as compared to the previous position. Thereby, it may be determined if the vehicle has moved to a higher floor, or a lower floor of e.g., a parking area comprising at least two floors. Determining if the travelled distance has been driven more upwards than downwards, or vice versa, is accomplished by analyzing vehicle data associated with the vehicle during, and/or after, driving the travelled distance from the previous position to the current position. That is, determining if the vehicle has driven the travelled distance more upwards than downwards, and vice versa, from the previous position to the current position may be based on driving characteristics and/or driving parameters. Accordingly, by analyzing driving parameters, such as e.g., vertical positioning at the current position as compared to the previous position, e.g., retrieved from a gyro of the vehicle, and/or analyzing driving characteristics, such as e.g., acceleration, deceleration and/or speed of the vehicle during the travelled distance, it is determined if the vehicle may have changed its position effectively vertically upwards, or effectively vertically downwards. Consequently, in that the introduced method may be triggered every time there is a "match", i.e., every time it is determined that a current position coincides with a previous position and/or it is determined that the vehicle has turned 360 degrees, the method may handle the vehicle driving between any arbitrary number of floors. By "effectively" changed position vertically upwards (/downwards) is here intended that, rather than having driven the travelled distance continuously upwards (/downwards), the vehicle may in fact have driven also downwards (/upwards) to some extent prior to finally reaching the current position.

The referred to previous floor may be any arbitrary floor associated with the previous position, such as a floor on which the vehicle is determined to have been situated when in the previous position. The referred to higher floor, which is arranged vertically higher than the previous floor, may be any arbitrary floor associated with the current position, such as a floor on which the vehicle is determined to be situated when in the current position. In a similar manner, the referred to lower floor, which is arranged vertically lower than the previous floor, may be any arbitrary floor associated with the current position, such as a floor on which the vehicle is determined to be situated when in the current position. The referred to "floor change determining unit" may be any arbitrary unit which to some extent may be comprised in one or a combination of suitable electronic devices, such as e.g., one or several integrated arbitrary electronic control unit (ECU) nodes, adapted to receive input regarding driving parameters and/or driving characteristics from one or a combination of vehicle sensors, such as e.g., a gyro indicating vertical movement, a braking device, such as e.g., a brake pedal, or an acceleration device, such as e.g., a throttle pedal.

It should be noted that one scenario may be that it is determined that the vehicle neither has driven more upwards than downwards, nor more downwards than upwards, subsequent that it has been determined that the current position and the previous position coincide vertically and/or subsequent that it has been determined that the previous position is a position from which the vehicle has turned 360 degrees as compared to the current position. Such a scenario may for instance occur in a roundabout.

According to an embodiment, the travelled distance may be greater than a predetermined minimum distance, a passed period of time for driving the travelled distance may be within a predetermined maximum period of time, and/or the travelled distance may be shorter than a predetermined maximum distance. Thereby, in determining that the travelled distance is greater than a minimum distance, it may subsequently be determined that the vehicle has actually moved to reach the current position from the previous position, and hence that the vehicle is not merely standing still. The minimum distance may for instance range from 30 meters down to a few meters.

Furthermore, in determining that a passed period of time for driving the travelled distance is within a maximum period of time, it may subsequently be determined that the travelled distance is driven during a reasonable time frame, e.g., during one and the same driving occurrence. Thereby, in a scenario where the vehicle arrives at a current position horizontally coinciding with a previous position, at which previous position the vehicle was situated a fairly long time ago, e.g., the day before, such as scenario may be ignored. Miscalculations which potentially may arise from e.g., parking at the same parking area two days in a row may hence be avoided. The maximum period of time may for instance range from several weeks down to a few minutes.

In a similar manner, in determining that the travelled distance is shorter than a predetermined maximum distance, it may subsequently be determined that the travelled distance is a reasonable distance for driving between floors of a parking area, e.g., driven during one and the same driving occurrence. Thereby, in a scenario where the vehicle arrives at a current position horizontally coinciding with a previous position, from which previous position the travelled distance to the current position is fairly long, e.g., several kilometers, such as scenario may be ignored. Miscalculations which potentially may arise from e.g., parking at the same parking area two days in a row may hence be avoided. The maximum distance may for instance range from tens of kilometers down to a few hundred meters.

According to another embodiment, the floor determining device increments, by means of an incrementing/decrementing unit comprised in the floor determining device, a value of a floor counter if the current position is determined to be situated on the higher floor, and decrements, by means of the incrementing unit, the value of the floor counter if the current position is determined to be situated on the lower floor. Thereby, by incrementing or decrementing a value of a floor counter, a convenient manner in which to keep track of a current floor of the vehicle, is provided. The floor counter may for instance be implemented by incrementing or decrementing an integer value. The value may furthermore be initiated to zero. Initiation may for instance be based on manual input from e.g., the driver, or occur automatically provided predetermined circumstances, such as entering a parking area or the value being considered to be erroneous. The referred to "incrementing/decrementing unit" may be any arbitrary unit which to some extent may be comprised in one or a combination of suitable electronic devices, such as e.g., one or several integrated arbitrary electronic control unit (ECU) nodes, adapted to receive input regarding change of floor.

According to a further embodiment, the floor determining device may provide, by means of a providing unit comprised in the floor determining device, the value to a display of the vehicle and/or to a remote electronic device. Thereby, the current floor on which the vehicle is considered to be situated, as indicated by the value, may be presented on an in-vehicle display and/or further processed by a remote electronic device. In providing the value to the display, e.g., a driver of the vehicle may be made aware of the current floor of the vehicle, as indicated by the value. Alternatively and/or additionally, in providing the value to a remote electronic device, such as e.g., a server or handheld user device, a user not necessarily in the vicinity of the vehicle may be made aware of the current floor of the vehicle. This may for instance be useful in a scenario where someone else than the original driver needs to locate the vehicle, e.g., another driver, or a service provider for delivery of a service. The value may, for instance, be provided once it is determined that the vehicle has parked.

The referred to "providing unit" may be any arbitrary unit which to some extent may be comprised in one or a combination of suitable electronic devices, such as e.g., one or several integrated arbitrary electronic control unit (ECU) nodes, adapted to communicate with a display of the vehicle and/or communicate, e.g., wirelessly, with a remote electronic device. Furthermore, the referred to remote electronic device may refer to, for instance a stationary server or computer, or a handheld user device, such as e.g., a mobile terminal or wireless terminal, a mobile phone, a computer such as e.g., a laptop, a Personal Digital Assistant (PDA) or tablet computer with wireless capability, a Machine to Machine (M2M) device or any other radio network unit capable to communicate with the providing unit.

According to yet another embodiment, the floor determining device may determine, by means of a revolution determining unit comprised in the floor determining device, that the vehicle, at the current position, has turned 360 degrees as compared to being positioned at the previous position, based on compass input from a vehicle compass of the vehicle, gyro input from a gyro of the vehicle and/or steering angle input from a steering wheel of the vehicle. Thereby, by considering input relating to the vehicle turning derived from one or a plurality of a vehicle compass, vehicle gyro and/or steering wheel, data commonly already available in the vehicle may be utilized for determining that the vehicle has turned 360 degrees. The referred to "revolution determining unit" may be any arbitrary unit which to some extent may be comprised in one or a combination of suitable electronic devices, such as e.g., one or several integrated arbitrary electronic control unit (ECU) nodes, adapted to receive input from a vehicle compass, vehicle gyro and/or steering wheel of the vehicle. Furthermore, "based on" is throughout this disclosure intended to be interpreted to likewise include at least "utilizing", "considering" and "taking into account".

Additionally and/or alternatively, the floor determining device may determine, by means of the revolution determining unit comprised in the floor determining device, that the vehicle, at the current position, has turned 360 degrees as compared to being positioned at the previous position, based on turning input from one or several of the wheels of the vehicle, e.g., from one or several anti-lock braking system, ABS, sensors.

According to still another embodiment, the floor determining device may further determine, by means of a horizontal positioning unit comprised in the floor determining device, that the previous position horizontally coincides with the current position based on positioning input from a positioning system, for instance Global Positioning System, GPS, and/or dead reckoning. Thereby, by considering input relating to the horizontal position of the vehicle derived from GPS and/or dead reckoning, data commonly already available in the vehicle may be utilized for determining that the previous position horizontally coincides with the current position. The referred to "horizontal positioning unit" may be any arbitrary unit which to some extent may be comprised in one or a combination of suitable electronic devices, such as e.g., one or several integrated arbitrary electronic control unit (ECU) nodes, adapted to receive input from a positioning system.

According to one embodiment, the floor determining device may further determine, by means of a characteristics determining unit comprised in the floor determining device, driving characteristics comprising acceleration and/or speed of the vehicle during the travelled distance, and corresponding required throttle output, such as throttle characteristics, of an acceleration device of the vehicle. The floor determining device may further compare, by means of a comparing unit comprised in the floor determining device, the required throttle output with default throttle output associated with driving a distance corresponding to the travelled distance on a plane surface, to accomplish the driving characteristics. The determining that the current position is situated on the higher or the lower floor may comprise the floor change determining unit determining that the current position is situated on the higher floor if the required throttle output is higher than the default throttle output, and that the current position is situated on the lower floor if the required throttle output is lower than the default throttle output.

Thereby, in considering required throttle output during the travelled distance and comparing with default throttle output, and subsequently in determining that the current position is situated on the higher/lower floor if the required throttle output is higher/lower than the default throttle output, vertical positioning of the vehicle may be accomplished. That is, since driving characteristics comprising acceleration and/or speed of the vehicle during the travelled distance is considered along with corresponding required throttle output of an acceleration device, and since the required throttle output is compared with default throttle output, i.e., hypothetical throttle output associated with driving a distance corresponding to the travelled distance on a plane surface, to accomplish the driving characteristics, it is possible to judge if the required throttle output is higher/lower than the default throttle output, and subsequently if the current position hence is situated on the higher or lower floor.

The acceleration device may for instance be represented by an acceleration pedal, such as a throttle. Furthermore, the referred to "default throttle output" refers to hypothetical throttle output of the acceleration device associated with driving a distance corresponding to the travelled distance on a plane surface, to accomplish the previously mentioned driving characteristic comprising acceleration and/or speed of the vehicle during the travelled distance. The referred to "characteristics determining unit" may be any arbitrary unit which to some extent may be comprised in one or a combination of suitable electronic devices, such as e.g., one or several integrated arbitrary electronic control unit (ECU) nodes, adapted to receive input from an acceleration device. In a similar manner, the referred to "comparing unit" may be any arbitrary unit which to some extent may be comprised in one or a combination of suitable electronic devices, such as e.g., one or several integrated arbitrary electronic control unit (ECU) nodes.

According to a second aspect of embodiments herein, the object is achieved by a floor determining device of a vehicle for determining on which floor of a parking area comprising at least two floors, the vehicle is positioned. The floor determining device comprises a match determining unit adapted for determining that the vehicle at a current position has driven a travelled distance from a previous position of the vehicle, which previous position is a position which horizontally coincides with the current position and/or which previous position is a position from which the vehicle has turned 360 degrees. The floor determining device further comprises a floor change determining unit adapted for determining that the current position is situated on a higher floor above a previous floor of the previous position if the vehicle is determined to have driven the travelled distance more upwards than downwards from the previous position to the current position, and that the current position is situated on a lower floor beneath the previous floor if the vehicle is determined to have driven the travelled distance more downwards than upwards.

According to an embodiment, the travelled distance may be greater than a predetermined minimum distance, a passed period of time for driving the travelled distance may be within a predetermined maximum period of time, and/or the travelled distance may be shorter than a predetermined maximum distance.

According to another embodiment, the floor determining device may further comprise an incrementing/decrementing unit adapted for incrementing a value of a floor counter if the current position is determined to be situated on the higher floor, and for decrementing the value of the floor counter if the current position is determined to be situated on the lower floor.

According to a further embodiment, the floor determining device may further comprise a providing unit adapted for providing the value to a display of the vehicle and/or to a remote electronic device.

According to yet another embodiment, the floor determining device may further comprise a revolution determining unit adapted for determining that the vehicle, at said current position, has turned 360 degrees as compared to being positioned at the previous position, based on compass input from a vehicle compass of the vehicle, gyro input from a gyro of the vehicle and/or steering angle input from a steering wheel of the vehicle.

According to still another embodiment, the floor determining device may further comprise a horizontal positioning unit adapted for determining that the previous position horizontally coincides with the current position based on positioning input from a positioning system, for instance Global Positioning System, GPS, and/or dead reckoning.

According to one embodiment, the floor determining unit may further comprise a characteristics determining unit adapted for determining driving characteristics comprising acceleration and/or speed of the vehicle during the travelled distance, and corresponding required throttle output of an acceleration device of the vehicle. The floor determining unit may further comprise a comparing unit adapted for comparing the required throttle output with default throttle output associated with driving a distance corresponding to the travelled distance on a plane surface, to accomplish the driving characteristics. The floor change determining unit may further be adapted for determining that the current position is situated on the higher floor if the required throttle output is higher than the default throttle output, and adapted for determining that the current position is situated on the lower floor if the required throttle output is lower than the default throttle output.

Similar advantages as those mentioned in the foregoing in relation to the first aspect correspondingly apply to the second aspect, why these advantages are not further discussed.

According to a third aspect of embodiments herein, the object is achieved by a vehicle comprising the previously mentioned floor determining device. Yet again, similar advantages as those mentioned in the foregoing in relation to the first aspect correspondingly apply to the third aspect, why these advantages are not further discussed.

BRIEF DESCRIPTION OF THE DRAWINGS

The various aspects of the non-limiting embodiments of the disclosure, including particular features and advantages, will be readily understood from the following detailed description and the attached drawings.

DETAILED DESCRIPTION

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to a floor determining device 1 of a vehicle 2 and a method therein for determining on which floor f0, f1, f2, f3 of a parking area 3 the vehicle 2 is positioned, there will be disclosed an approach for distinguishing between different floors of the parking area 3.

Figure 1A:
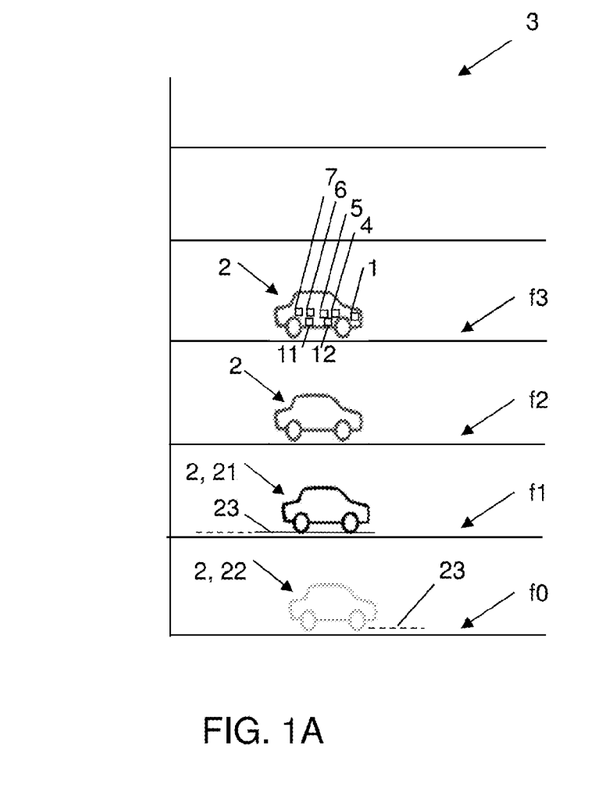
FIG. 1A illustrates an exemplifying parking area comprising at least two floors, and an exemplifying vehicle comprising a floor determining device for determining on which floor of the parking area the vehicle is positioned, according to embodiments of the disclosure.

Referring now to the figures and FIG. 1A in particular, there is depicted, in a schematic side view, an exemplifying parking area 3 comprising at least two floors, and an exemplifying vehicle 2 comprising a floor determining device 1 for determining on which floor f0, f1, f2, f3 of the parking area 3 the vehicle 2 is positioned, according to embodiments of the disclosure. The parking area 3 comprises at least two floors, and may e.g., be represented by a multi-story car park comprising any arbitrary number of floors. In the illustrated embodiment, the floors f0, f1, f2, f3 of the multi-story car park are in parallel with the ground and essentially aligned in a vertical direction, i.e., arranged on top of one another. Ramps, on which the vehicle 2 may drive from one floor f0, f1, f2, f3 to another f0, f1, f2, f3 may be disposed and arranged in any arbitrary manner.

The vehicle 2, which in the shown embodiment is represented by a car, is at a current position 21, which is situated on the first floor f1. The vehicle 2 has driven a travelled distance 23 from a previous position 22 of the vehicle 2, here situated on the ground floor f0, to the current position 21, i.e., here upwards. It should be noted that the floor indications are merely exemplifying; the vehicle 2 may drive between any, as well as several, of the illustrated floors f0, f1, f2, f3. The previous position 22 is a position which horizontally coincides with the current position 21. Furthermore, the travelled distance 23 may be greater than a predetermined minimum distance, and/or shorter than a predetermined maximum distance.

The vehicle 2 may comprise an acceleration device 4, here a throttle, a vehicle compass 5, a steering wheel 6, a positioning system 7, here a Global Positioning System, GPS, in combination with dead reckoning, a display 11 and/or a gyro 12.

Further illustrated in FIG. 1A is an electronic device 9, which here is represented by a handheld user device, to which a value 8 may be provided by the floor determining device 1.

Figure 1B:
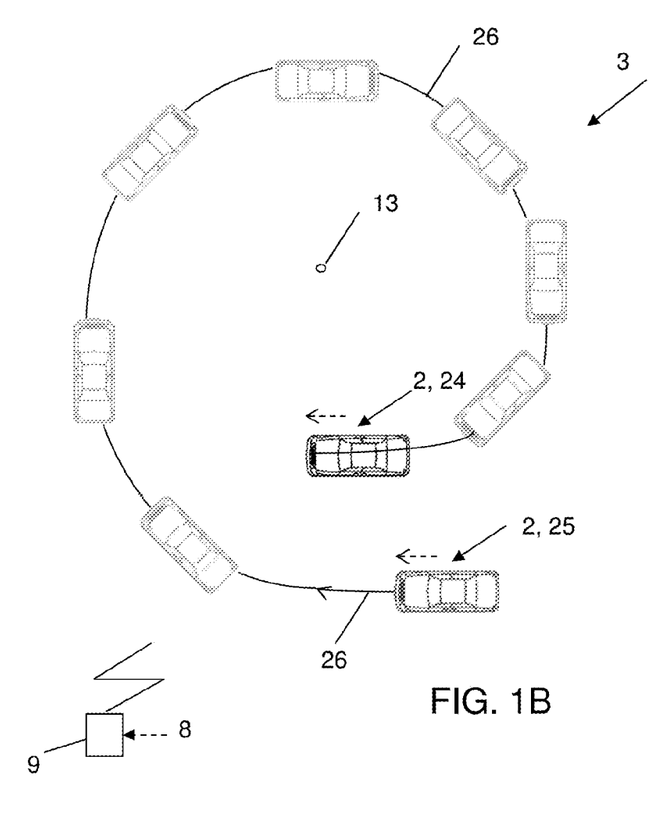
FIG. 1B illustrates an exemplifying parking area comprising at least two floors, and an exemplifying vehicle comprising a floor determining device for determining on which floor of the parking area the vehicle is positioned, according to alternative embodiments of the disclosure.

FIG. 1B illustrates, seen from above, an exemplifying parking area 3 comprising at least two floors, and an exemplifying vehicle 2 comprising a floor determining device 1 for determining on which floor f0, f1, f2, f3 of the parking area 3 the vehicle 2 is positioned, according to alternative embodiments of the disclosure.

In the illustrated embodiment of FIG. 1B, ramps on which the vehicle 2 may drive from one floor to another, are disposed in a spiral manner, such that the vehicle 2 may wind around a center axis 13 to drive from one floor f0, f1, f2, f3 to another floor f0, f1, f2, f3.

The vehicle 2 of FIG. 1B, is at a current position 24, which here is situated on the second floor f2. The vehicle 2 has driven a travelled distance 26 from a previous position 25 of the vehicle 2, here situated on the third floor f3, to the current position 24, i.e., here downwards. The previous position 25 is a position from which the vehicle 2 has turned, essentially, 360 degrees, i.e., a revolution.

Figure 2:
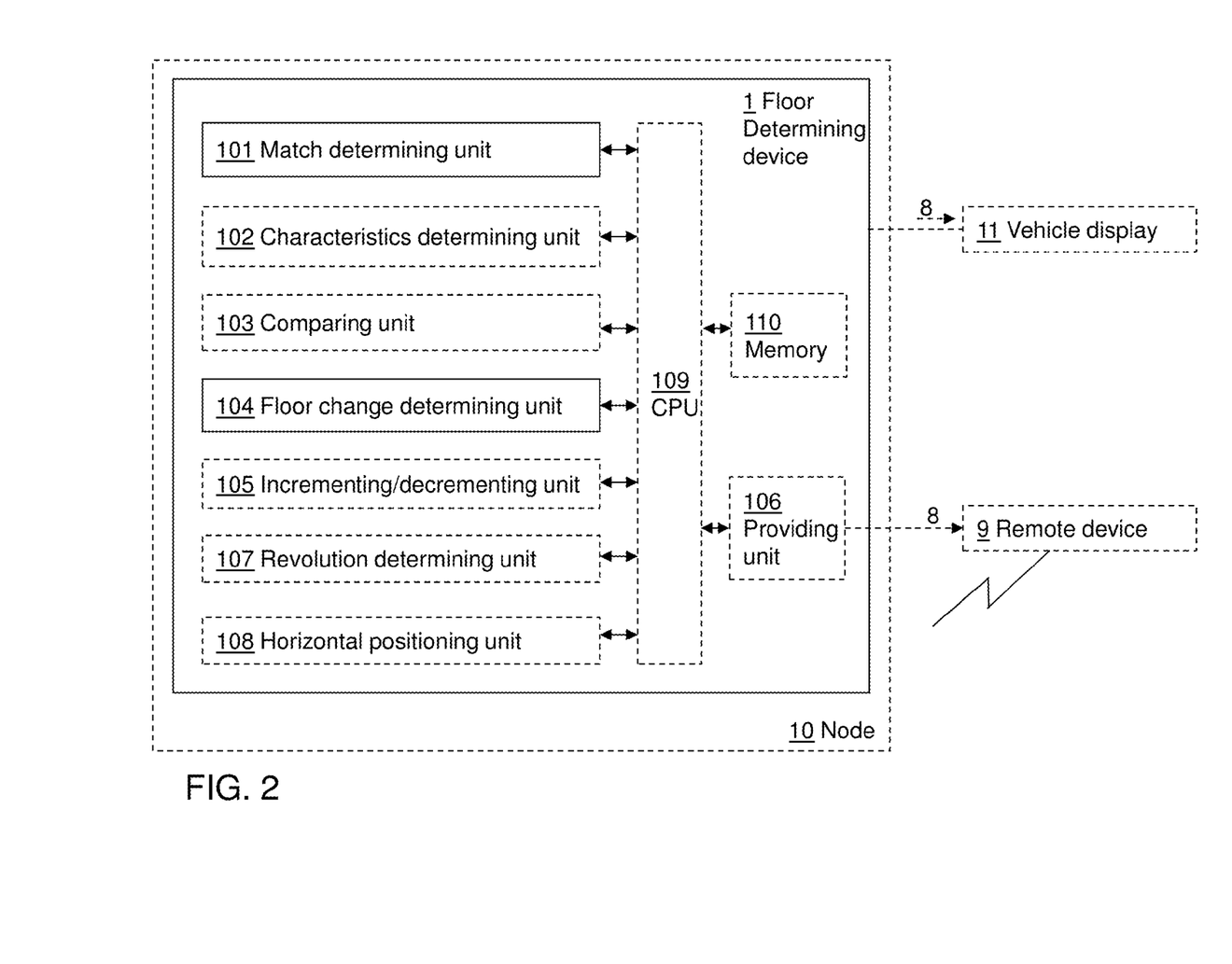
FIG. 2 is a schematic block diagram illustrating a floor determining device according to embodiments of the disclosure.

As further shown in FIG. 2, which depicts a schematic block diagram illustrating a floor determining device 1 according to embodiments of the disclosure, the floor determining device 1 comprises a match determining unit 101 and a floor change determining unit 104. The floor change determining unit 1 may further comprise a characteristic determining unit 102, a comparing unit 103, an incrementing/decrementing unit 105, a providing unit 106, a revolution determining unit 107, and/or a horizontal positioning unit 108. Furthermore, the embodiments herein for determining on which floor f0, f1, f2, f3 of a parking area 3 a vehicle 2 is positioned, may be implemented through one or more processors, such as a processor 109, here denoted CPU, together with computer program code for performing the functions and actions of the embodiments herein. Said program code may also be provided as a computer program product, for instance in the form of a data carrier carrying computer program code for performing the embodiments herein when being loaded into the floor determining device 1. One such carrier may be in the form of a CD ROM disc. It is however feasible with other data carriers such as a memory stick. The computer program code may furthermore be provided as pure program code on a server and downloaded to the floor determining device 1.

The floor determining device 1 may further comprise a memory 110 comprising one or more memory units. The memory 110 may be arranged to be used to store e.g., information, and further to store data, configurations, schedulings, and applications, to perform the methods herein when being executed in the floor determining device 1. Furthermore, the match determining unit 101, the floor change determining unit 104, the optional characteristics determining unit 102, the optional comparing unit 103, the optional incrementing/decrementing unit 105, the optional providing unit 106, the optional revolution determining unit 107, the optional horizontal positioning unit 108, the processor 109, and the memory 110 may for instance be implemented in one or several arbitrary nodes 10. A node 10 may be an electronic control unit (ECU) or any suitable generic electronic device. Those skilled in the art will also appreciate that the match determining unit 101, the floor change determining unit 104, the optional characteristics determining unit 102, the optional comparing unit 103, the optional incrementing/decrementing unit 105, the optional providing unit 106, the optional revolution determining unit 107, and the optional horizontal positioning unit 108 described above, and which will be described in more detail later on in this description, may refer to a combination of analog and digital circuits, and/or one or more processors configured with software and/or firmware, e.g., stored in a memory such as the memory 110, that when executed by the one or more processors such as the processor 109 perform as will be described in more detail later on. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

The revolution determining unit 107 may optionally be comprised in the match determining unit 101. In a similar manner, the horizontal positioning unit 108 unit may optionally be comprised in the match determining unit 101.

Figure 3:
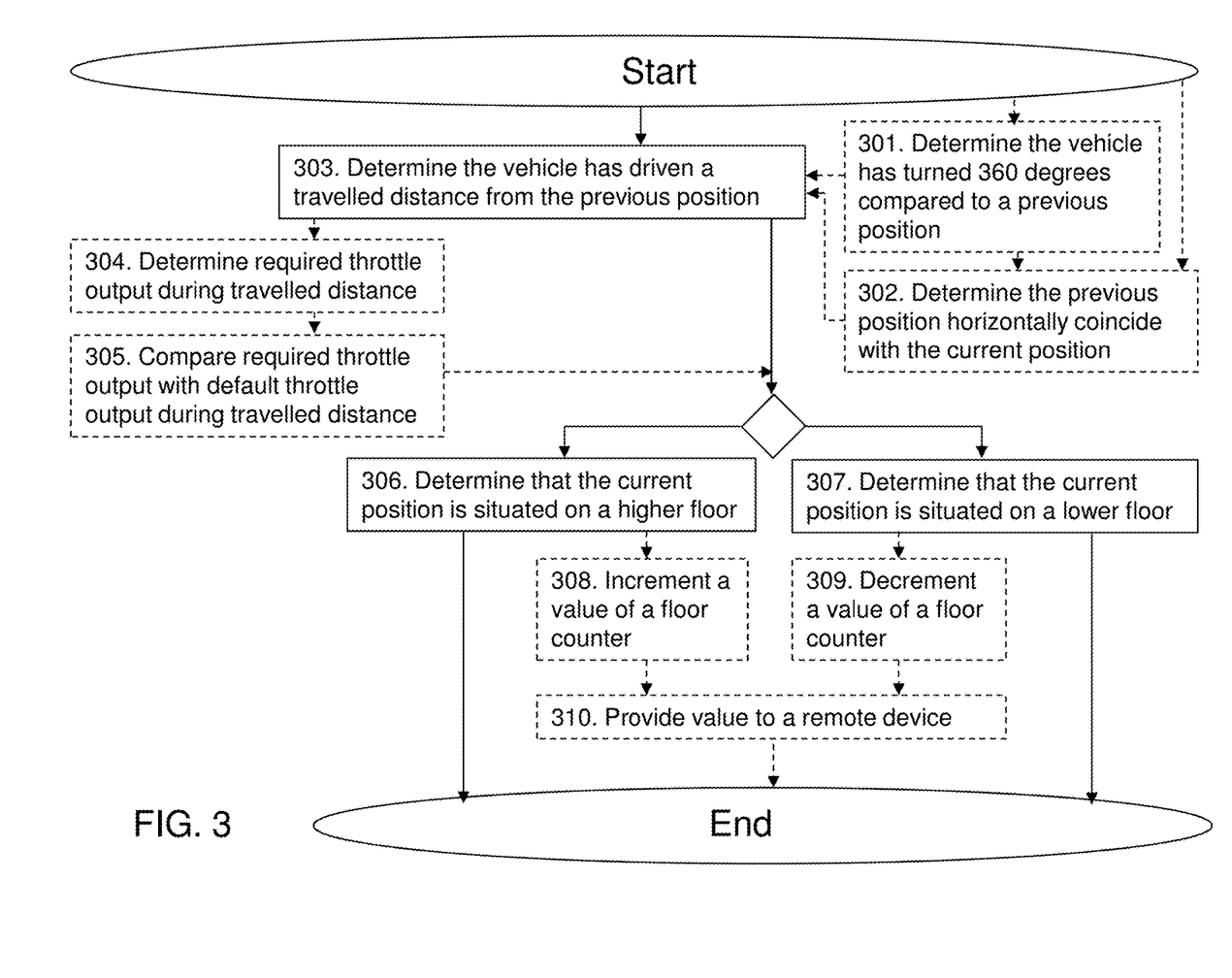
FIG. 3 is a flowchart depicting an exemplifying method for determining on which floor of a parking area a vehicle is positioned, according to embodiments of the disclosure.

FIG. 3 is a flowchart depicting an exemplifying method performed by a floor determining device 1 of a vehicle 2 for determining on which floor f0, f1, f2, f3 of a parking area 3 comprising at least two floors, a vehicle 2 is positioned, according to embodiments of the disclosure. The exemplifying method, which may be continuously repeated, comprises the following actions discussed with support from FIGS. 1 and 2. The actions may be taken in any suitable order, and even be performed simultaneously where applicable. It should be noted that the optional Action 301 may be performed irrespective of Action 302.

Action 301

In optional Action 301, the revolution determining unit 107 determines that the vehicle 2, at the current position 24, has turned 360 degrees as compared to being positioned at the previous position 25, based on compass input from the vehicle compass 5 of the vehicle 2, gyro input from the gyro 12 of the vehicle 2 and/or steering angle input from the steering wheel 6 of the vehicle 2.

Action 302

In optional Action 302, the horizontal positioning unit 108 determines that the previous position 22 horizontally coincides with the current position 21 based on positioning input from the positioning system 7, for instance Global Positioning System, GPS, and/or dead reckoning.

Action 303

In Action 303, the match determining unit 101 determines that the vehicle 2 at the current position 21, 24 has driven the travelled distance 23, 26 from the previous position 22, 25 of the vehicle 2, which previous position 22, 25 is a position 22 which horizontally coincides with the current position 21 and/or which previous position 22, 25 is a position 25 from which the vehicle 2 has turned 360 degrees.

Optionally, it is determined if the travelled distance 23, 26 is greater than a predetermined minimum distance, if a passed period of time for driving the travelled distance 23, 26 is within a predetermined maximum period of time, and/or if the travelled distance 23, 26 is shorter than a predetermined maximum distance.

Action 304

In optional Action 304, the characteristics determining unit 102 determines driving characteristics comprising acceleration and/or speed of the vehicle 2 during the travelled distance 23, 26, and corresponding required throttle output of the acceleration device 4 of the vehicle 2.

Action 305

In optional Action 305, the comparing unit 103 compares the required throttle output with default throttle output associated with driving a distance corresponding to the travelled distance 23, 26 on a plane surface, to accomplish the driving characteristics.

Action 306

In Action 306, the floor change determining unit 104 determines that the current position 21, 24 is situated on the higher floor f1 above the previous floor f0 of the previous position 22 if the vehicle 2 is determined to have driven the travelled distance 23, 26 more upwards than downwards from the previous position 22, 25 to the current position 21, 24.

Optionally, Action 306 of determining that the current position 21, 24 is situated on the higher floor f1 if the vehicle 2 is determined to have driven the travelled distance 23, 26 more upwards than downwards, comprises determining that the current position 21, 24 is situated on the higher floor f1 if the required throttle output is higher than the default throttle output.

Action 307

In Action 307, the floor change determining unit 104 determines that the current position 21, 24 is situated on the lower floor beneath the previous floor f0 if the vehicle 2 is determined to have driven the travelled distance 23, 26 more downwards than upwards.

Optionally, Action 307 of determining that the current position 21, 24 is situated on the lower floor if the vehicle 2 is determined to have driven the travelled distance 23, 26 more downwards than upwards, comprises determining that the current position 21, 24 is situated on the lower floor if the required throttle output is lower than the default throttle output.

It should be noted that one scenario may be that it is determined that the vehicle 2 neither has driven more upwards than downwards, nor more downwards than upwards, subsequent that it has been determined 302, 303 that the current position 21 and the previous position 22 coincide vertically and/or subsequent that it has been determined 301, 303 that the previous position 25 is a position from which the vehicle has turned 360 degrees as compared to the current position 24. Such a scenario may for instance occur in a roundabout.

Action 308

In optional Action 308, the incrementing/decrementing unit 105 increments the value 8 of the floor counter if the current position 21, 24 is determined to be situated on the higher floor f1.

Action 309

In optional Action 309, the incrementing/decrementing unit 105 decrements the value 8 of the floor counter if the current position 21, 24 is determined to be situated on the lower floor.

Action 310

In optional Action 310, the providing unit 106 provides the value 8 to the display 11 of the vehicle 2 and/or to the remote electronic device 9.

Consequently, according to the floor determining described in the foregoing, by determining if a travelled distance 23, 26 from a previous position 22, 25 to a current position 21, 24 has been driven more upwards than downwards, or vice versa, by analyzing vehicle data associated with the vehicle 2 during, and/or after, driving the travelled distance 23, 26, it may be determined if the vehicle 2 has moved to a higher floor f1, or a lower floor. Furthermore, since the introduced method may be triggered every time there is a "match", i.e., every time it is determined that a current position 21 coincides with a previous position 22 and/or it is determined that the vehicle has turned 360 degrees, the method may be repeated for each floor f0, f1, f2, f3 the vehicle 2 passes/is located on.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality. Furthermore, the features of various implementing embodiments may be combined to form further embodiments according to the disclosure.

What is claimed is:

1. A method performed by a floor determining device of a vehicle for determining on which floor of a parking area, comprising at least two floors, the vehicle is positioned, the method comprising:
    determining, by means of a match determining unit comprised in the floor determining device, that the vehicle at a current position has driven a travelled distance from a previous position of the vehicle, which previous position is a position which horizontally coincides with the current position; and
    determining, by means of a floor change determining unit comprised in the floor determining device, that the current position is situated on a higher floor above a previous floor of the previous position if the vehicle is determined to have driven the travelled distance more upwards than downwards from the previous position to the current position, or that the current position is situated on a lower floor beneath the previous floor if the vehicle is determined to have driven the travelled distance more downwards than upwards, based on analyzing driving characteristics associated with the vehicle during, and/or after, driving the travelled distance from the previous position to the current position.

2. The method according to claim 1 wherein the travelled distance is greater than a predetermined minimum distance, a passed period of time for driving the travelled distance is within a predetermined maximum period of time, and/or the travelled distance is shorter than a predetermined maximum distance.

3. The method according to claim 1 further comprising:
    incrementing, by means of an incrementing/decrementing unit comprised in the floor determining device, a value of a floor counter if the current position is determined to be situated on the higher floor; or
    decrementing, by means of the incrementing unit, the value of the floor counter if the current position is determined to be situated on the lower floor.

4. The method according to claim 3 further comprising:
    providing, by means of a providing unit comprised in the floor determining device, the value to a display of the vehicle and/or to a remote electronic device.

5. The method according to claim 1 further comprising:
    determining, by means of a revolution determining unit comprised in the floor determining device, that the vehicle, at the current position, has turned 360 degrees as compared to being positioned at the previous position, based on compass input from a vehicle compass of the vehicle, gyro input from a gyro of the vehicle and/or steering angle input from a steering wheel of the vehicle.

6. The method according to claim 1 further comprising:
    determining, by means of a horizontal positioning unit comprised in the floor determining device, that the previous position horizontally coincides with the current position based on positioning input from a positioning system.

7. The method according to claim 6 wherein the positioning system comprises a Global Positioning System and/or a dead reckoning system.

8. The method according to claim 1 further comprising:
    determining, by means of a characteristics determining unit comprised in the floor determining device, driving characteristics comprising acceleration and/or speed of the vehicle during the travelled distance, and corresponding required throttle output of an acceleration device of the vehicle; and
    comparing, by means of a comparing unit comprised in the floor determining device, the required throttle output with default throttle output associated with driving a distance corresponding to the travelled distance on a plane surface, to accomplish the driving characteristics;
    wherein the determining that the current position is situated on the higher or the lower floor comprises determining that the current position is situated on the higher floor if the required throttle output is higher than the default throttle output, or that the current position is situated on the lower floor if the required throttle output is lower than the default throttle output.

9. A floor determining device of a vehicle for determining on which floor of a parking area, comprising at least two floors, the vehicle is positioned, the floor determining device comprising:
    a match determining unit adapted for determining that the vehicle at a current position has driven a travelled distance from a previous position of the vehicle, which previous position is a position which horizontally coincides with the current position; and
    a floor change determining unit adapted for determining that the current position is situated on a higher floor above a previous floor of the previous position if the vehicle is determined to have driven the travelled distance more upwards than downwards from the previous position to the current position, and that the current position is situated on a lower floor beneath the previous floor if the vehicle is determined to have driven the travelled distance more downwards than upwards, based on analyzing driving characteristics associated with the vehicle during, and/or after, driving the travelled distance from the previous position to the current position.

10. The floor determining device according to claim 9 wherein the travelled distance is greater than a predetermined minimum distance, a passed period of time for driving the travelled distance is within a predetermined maximum period of time, and/or the travelled distance is shorter than a predetermined maximum distance.

11. The floor determining device according to claim 9 further comprising an incrementing/decrementing unit adapted for:
   incrementing a value of a floor counter if the current position is determined to be situated on the higher floor; and
   decrementing the value of the floor counter if the current position is determined to be situated on the lower floor.

12. The floor determining device according to claim 11 further comprising:
   a providing unit adapted for providing the value to a display of the vehicle and/or to a remote electronic device.

13. The floor determining device according to claim 9 further comprising:
   a revolution determining unit adapted for determining that the vehicle, at the current position, has turned 360 degrees as compared to being positioned at the previous position, based on compass input from a vehicle compass of the vehicle, gyro input from a gyro of the vehicle and/or steering angle input from a steering wheel of the vehicle.

14. The floor determining device according to claim 9 further comprising:
   a horizontal positioning unit adapted for determining that the previous position horizontally coincides with the current position based on positioning input from a positioning system.

15. The floor determining device according to claim 14 wherein the positioning system comprises a Global Positioning System and/or a dead reckoning system.

16. The floor determining device according to claim 9 further comprising:
   a characteristics determining unit adapted for determining driving characteristics comprising acceleration and/or speed of the vehicle during the travelled distance, and corresponding required throttle output of an acceleration device of the vehicle; and
   a comparing unit adapted for comparing the required throttle output with default throttle output associated with driving a distance corresponding to the travelled distance on a plane surface, to accomplish the driving characteristics;
   wherein the floor change determining unit further is adapted for determining that the current position is situated on the higher floor if the required throttle output is higher than the default throttle output, and for determining that the current position is situated on the lower floor if the required throttle output is lower than the default throttle output.

17. A vehicle comprising the floor determining device of claim 9.

18. The method according to claim 1 wherein determining the travelled distance is performed subsequent to determining that the current position horizontally coincides with the previous position.

19. The method according to claim 1 wherein the previous position horizontally coincides with the current position when the current position is within a few meters of the previous position as seen from above.

20. The method according to claim 1 wherein the driving characteristics comprise acceleration, deceleration and/or speed of the vehicle during the travelled distance.

* * * * *